United States Patent
Braunschädel

[11] Patent Number: 6,139,048
[45] Date of Patent: Oct. 31, 2000

[54] IMPACT PROTECTION DEVICE FOR VEHICLE OCCUPANTS WITH AN INFLATABLE GAS BAG

[75] Inventor: Axel Braunschädel, Goldbach, Germany

[73] Assignee: TRW Automoive Safety Systems GmbH, Aschaffenburg, Germany

[21] Appl. No.: 09/193,155

[22] Filed: Nov. 17, 1998

[30] Foreign Application Priority Data

Nov. 19, 1997 [DE] Germany .......................... 297 20 461

[51] Int. Cl.[7] .................................................. B60R 21/16
[52] U.S. Cl. ..................................... 280/728.1; 280/743.1
[58] Field of Search ................................ 280/739, 728.1, 280/743.1, 738, 740

[56] References Cited

U.S. PATENT DOCUMENTS

| | | |
|---|---|---|
| 3,573,885 | 4/1971 | Brawn et al. . |
| 3,887,213 | 6/1975 | Goetz ........................................ 280/738 |
| 3,888,505 | 6/1975 | Shibamoto ............................... 280/738 |
| 3,929,350 | 12/1975 | Pech ....................................... 280/738 X |
| 4,097,065 | 6/1978 | Okada et al. . |
| 4,126,325 | 11/1978 | Weman ..................................... 280/738 |
| 5,016,913 | 5/1991 | Nakajima et al. ....................... 280/738 |
| 5,193,847 | 3/1993 | Nakayama ............................... 280/738 |
| 5,280,953 | 1/1994 | Wolanin et al. ......................... 280/739 |
| 5,310,215 | 5/1994 | Wallner .................................... 280/739 |
| 5,350,188 | 9/1994 | Sato ......................................... 280/739 |
| 5,372,381 | 12/1994 | Herridge ................................. 280/743.1 |
| 5,492,363 | 2/1996 | Hartmeyer et al. ...................... 280/739 |
| 5,498,031 | 3/1996 | Kosugi ................................... 280/743.1 |
| 5,520,413 | 5/1996 | Mossi et al. ............................. 280/729 |
| 5,560,649 | 10/1996 | Saderholm ........................... 280/739 X |
| 5,566,972 | 10/1996 | Yoshida et al. ................... 280/743.1 X |
| 5,685,562 | 11/1997 | Jordan et al. ............................. 280/739 |
| 5,704,639 | 1/1998 | Cundhill et al. ......................... 280/739 |

FOREIGN PATENT DOCUMENTS

| | | |
|---|---|---|
| 0639484 | 2/1995 | European Pat. Off. . |
| 0670247 | 9/1995 | European Pat. Off. . |
| 1962890 | 7/1970 | Germany . |
| 3618060 | 12/1987 | Germany . |
| 3618060 A1 | 5/1994 | Germany ................................ 280/739 |
| 6-127330 | 5/1994 | Japan ..................................... 280/739 |
| 6-286569 | 10/1994 | Japan ..................................... 280/739 |
| 2302845 | 2/1997 | United Kingdom . |

*Primary Examiner*—Lanna Mai
*Attorney, Agent, or Firm*—Tarolli, Sundheim, Covell, Tummino & Szabo L.L.P.

[57] ABSTRACT

A gas bag for a vehicle occupant restraint device has a vent opening. A non-elastic thread is arranged on the outer surface of the gas bag (1) forming a loop (4) around the vent opening (2). Each end of the thread is attached to a stretchable surface portion of the gas bag. The vent opening has a flow cross-section that is able to be reduced in proportion to an elastic expansion of the gas bag (1) as a result of internal pressure which is generated when a vehicle occupant plunges into the inflated gas bag.

7 Claims, 3 Drawing Sheets

IMPACT PROTECTION DEVICE FOR VEHICLE OCCUPANTS WITH AN INFLATABLE GAS BAG

The invention relates to an impact protection device for vehicle occupants with an inflatable gas bag and a gas generator for the sudden inflation of the gas bag on igniting of a propellant charge arranged in the gas generator.

Such impact protection devices have been known for many years under the abbreviated title "airbag" and almost all modern motor vehicles are equipped with them as standard practice. In the meantime, not only are the airbags offered which are accommodated in the steering wheel for the driver of the vehicle, but also passenger airbags, side airbags, head airbags etc. are offered as standard practice or at least as an option. The purpose of all these impact protection devices is to avoid injuries to the vehicle occupants as a result of excessive inertial forces.

For activation of the gas bag, a signal is triggered by means of suitable acceleration sensors, which brings about a prompt inflation of the gas bag in order to install a cushion in the shortest period of time between the occupants and the bodywork parts of the vehicle, into which cushion the vehicle occupant can plunge to be retained thereby. For this, the cushion or the gas pillow must be constructed so as to be flexible, i.e. it must in fact each its full size promptly, but it must not remain hard or fully elastic and it must not throw the plunging body pack. Rather, it must have a more plastic behaviour with regard to shock and must be compressible under the influence of the impinging mass.

For this, the gas filling must be able to escape from the airbag. This is frequently achieved in that the gas bag consists of a fabric which has a certain gas-permeability over the entire surface, which does not have a negative effect during the sudden inflation but which leads to an at least partial emptying of the gas bag when the body plunges into it, whereby the gas bag assumes the plastic behaviour with regard to shock which is aimed for.

The inflation and deflation behaviour of gas bags is tested with so-called "dummies" in impact tests. Here, dolls copied from the human body are arranged in a vehicle bodywork, have seatbelts put on them and are driven at a defined speed against a fixed obstacle. By means of a plurality of acceleration sensors, the sequence of movement of various body parts is determined here and is evaluated together with the speed- and acceleration parameters of the vehicle bodywork, in order to be able to indicate parameters for the design of the impact protection devices. Last but not least, the outflow behaviour of a gas bag is also established in this way.

In so doing, the problem a rises that the mass of a body plunging into an airbag in an accident can vary within broad limits. The weight range of vehicle occupants is only roughly circumscribed at 50 and 100 kg. It should be clear that a big individual has to be "braked" differently by an airbag from a small, slim person. Accordingly, the impact tests are also carried out with dummies of different weight, for which a percentage classification has been developed. One speaks of a 5% dummy when one wishes to simulate a small impact mass and of a 95% dummy when one wishes to simulate a large impact mass.

For the design of a gas bag, this produces the problem that one can not predict the weight of an individual falling into the inflated gas bag in an accident. As regards the design of the inflation volume, one must go to the upper limit; this approach is not practical with regard to the outlet behaviour, because the airbag would be too "hard" for a small person.

An object of the invention is to provide a gas bag which has an outlet behaviour adapted to a plunging body mass, so that all possible vehicle occupants can be protected in an optimum manner by an airbag of identical constitution.

According to the invention the gas bag has a vent opening the cross-section of which is able to be reduced in proportion to an elastic expansion of the gas bag as a result of internal pressure generated when a vehicle occupant plunges into the gas bag. A gas bag which is constructed in such a way has the advantage that it adjusts itself automatically to the plunging body mass with regard to the outlet behaviour, the flow cross-section of the vent opening being controlled so that the gas can escape more quickly when a light body plunges in than when a heavy body plunges in. This advantage is achieved in a very simple manner because no separate regulating circuit with sensors to determine the body weight is necessary for controlling the outlet cross-section of the vent opening, because the components which are arranged according to the invention can readily bring about an effective automatic regulation of such cross-section.

Further details of the invention are explained in further detail with reference to the example embodiments illustrated in FIGS. 1 to 6, in which.

Figure 1:
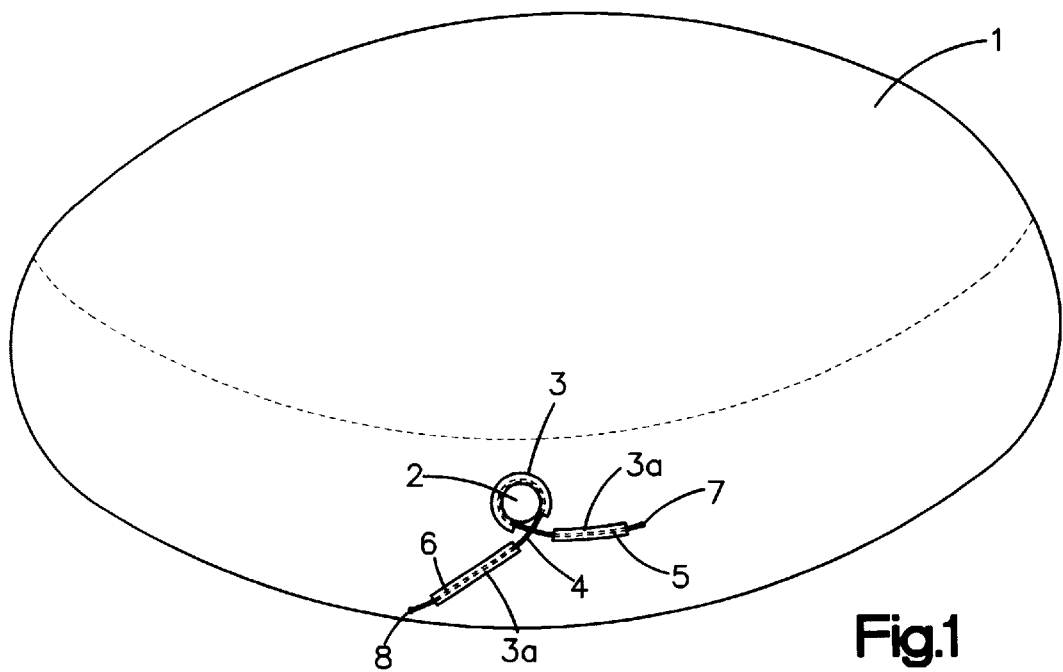
FIG. 1 shows an inflated gas bag with a first embodiment of the invention.

In the gas bag 1, illustrated in FIG. 1, a vent opening 2 is arranged in a meridian region where, according to experience, the greatest amount of expansion occurs on plunging of a vehicle occupant into the gas bag 1. A thread has a main section 4 forming a loop along the edge of the vent opening 2. The thread is of a non-elastic material and has outer sections 5, 6 crossing each other. The ends 7, 8 of the thread are attached to the outer surface of the gas bag at locations separated from each other by a stretchable textile material. Sections 5, 6 of the thread are guided in guide members 3a which are fastened to the gas bag 1. The main section 4 of the thread is guided in a sheath 3 along the edge of the vent opening 2. With an expansion of the gas bag 1, the distance between the ends 7 and 8 is increased and the thread consisting of non-elastic material is tensioned such that the loop 4 automatically tightens and hence reduces the cross-section of the vent opening 2. It is readily clear that the reduction of the outlet cross-section takes place in proportion to the expansion of the gas bag 1, which in turn is dependent on the internal pressure produced by the plunging of a vehicle occupant into the gas bag 1. In this way, the target which is being aimed for is reached, namely of preventing the outflow of the gas from the gas bag 1 less when a light body plunges in than when a heavy body plunges in.

Figure 2:
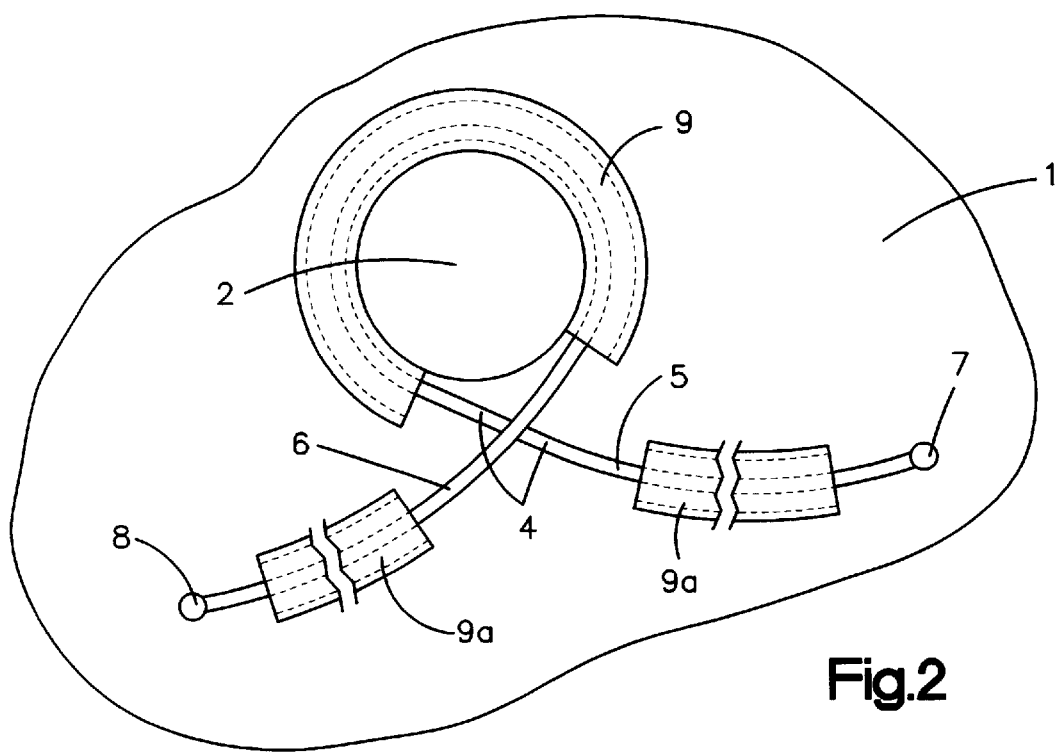
FIG. 2 shows an enlarged cut-out from FIG. 1.

In the embodiment according to FIG. 2, the guides for the thread consist of fabric strips 9 and 9a which are sewn onto the gas bag 1. Of course it is also possible to connect the fabric strips with the gas bag 1 in a different way, it is only important that guides are provided in which the thread is held so as to be movable longitudinally. The vent opening 2, loop 4, outer sections 5 and 6 of the thread and also its ends 7 and 8 correspond to the embodiment according to FIG. 1.

Figure 3:
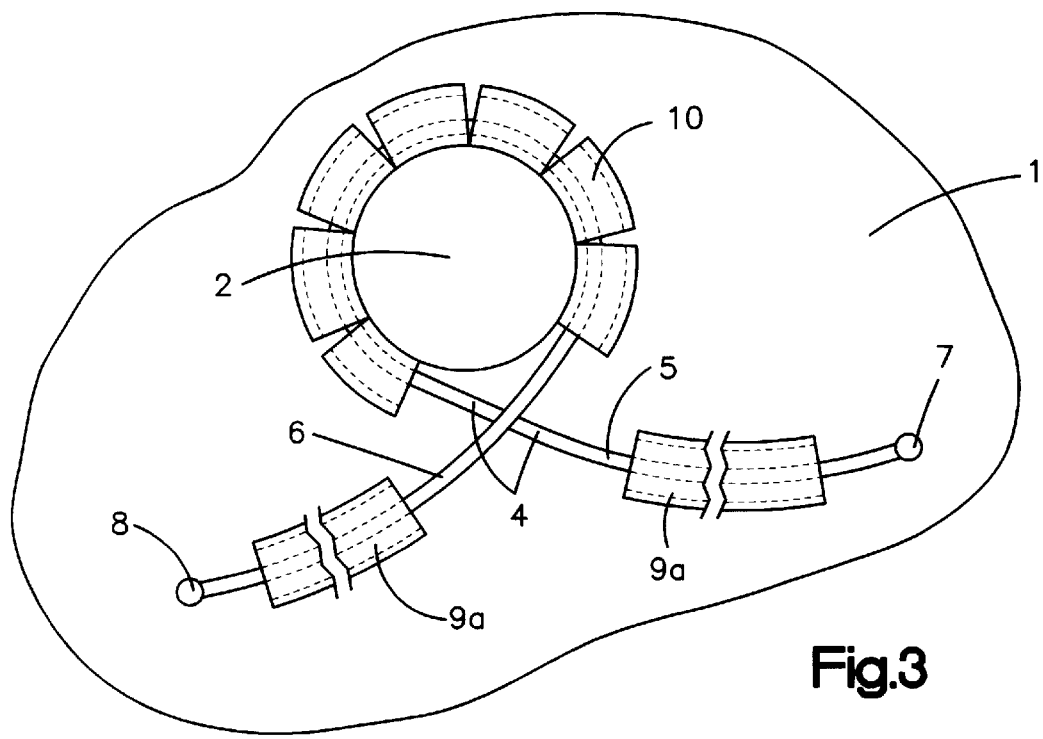
FIG. 3 shows a second embodiment of the inventive idea.

The embodiment according to FIG. 3 differs from that according to FIG. 2 merely in that the thread guide in the region of the loop is formed of regions 10 of the flexible gas bag material folded outwards in the manner of a loop and sewn along the edge of the vent opening. In this way, the fabric material of the gas bag 1 which is to be removed for the creation of the vent opening 2 can be used in a very suitable and cost-saving manner.

Figure 4:
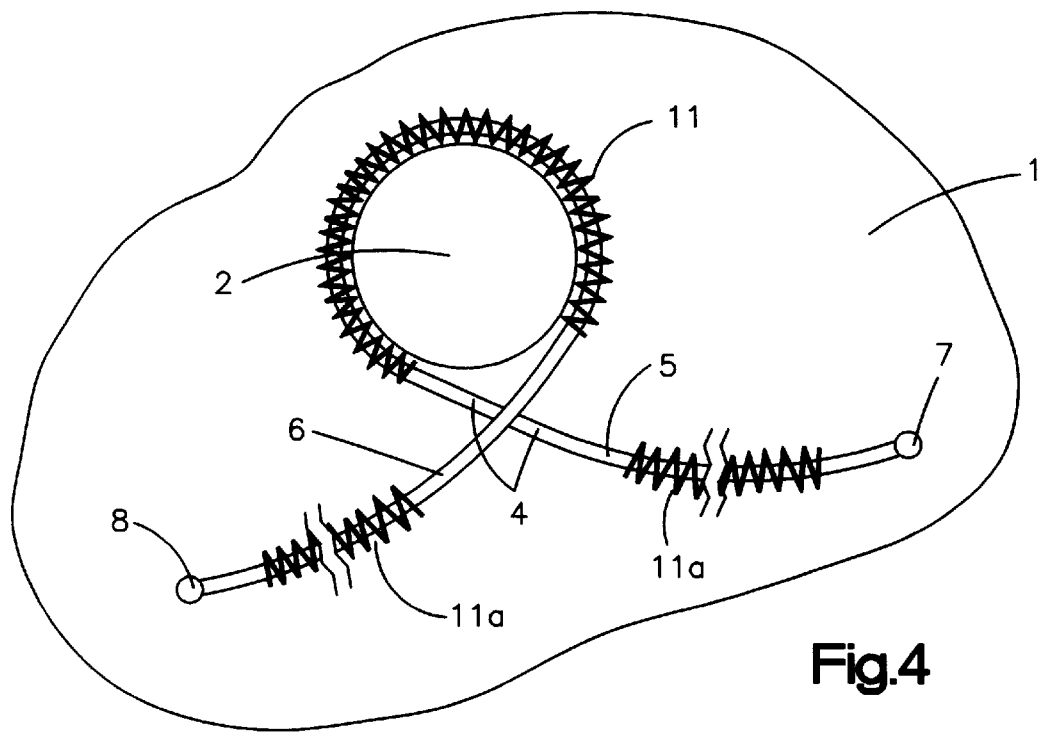
FIG. 4 shows a third embodiment of the inventive idea.

In the embodiment according to FIG. 4, the guide for the thread consists of a zigzag seam 11, 11*a* which is placed over the guided regions of the thread such that the thread is held so as to be longitudinally movable therebeneath. The remaining reference numbers correspond to those in FIGS. 1 to 3 and do not need to be explained again.

Figure 5:
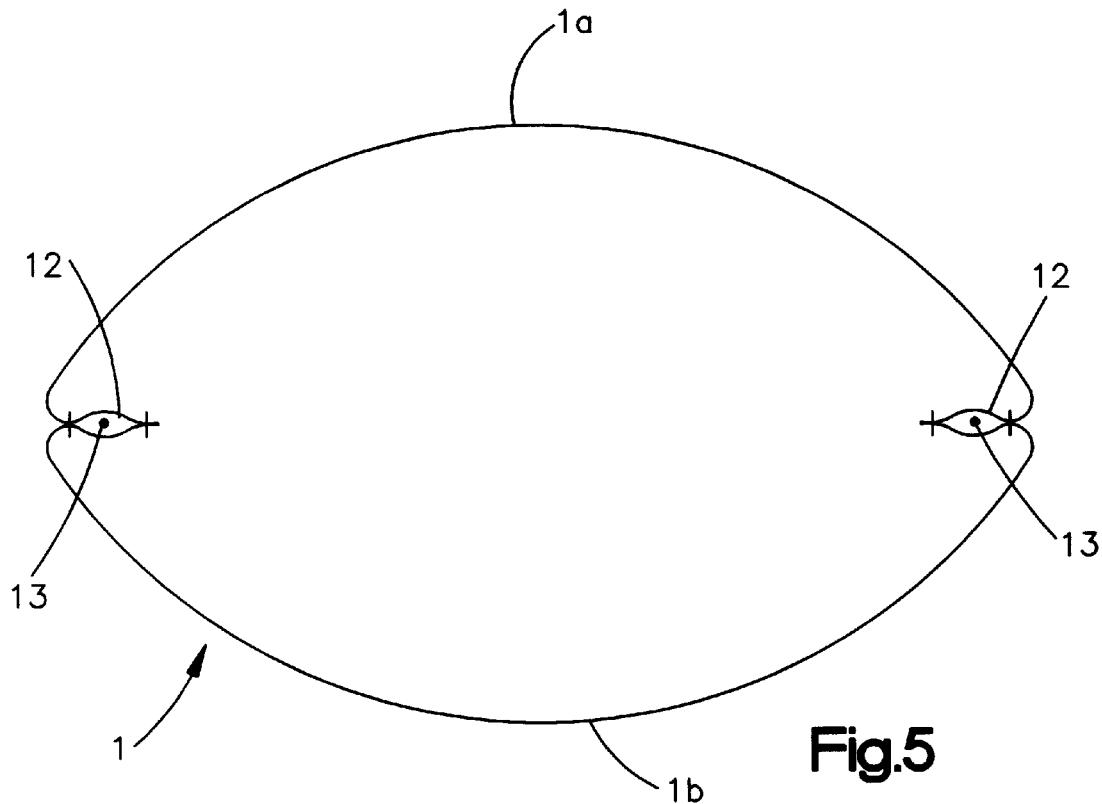
FIG. 5 shows a fourth embodiment of the inventive idea.
Figure 6:
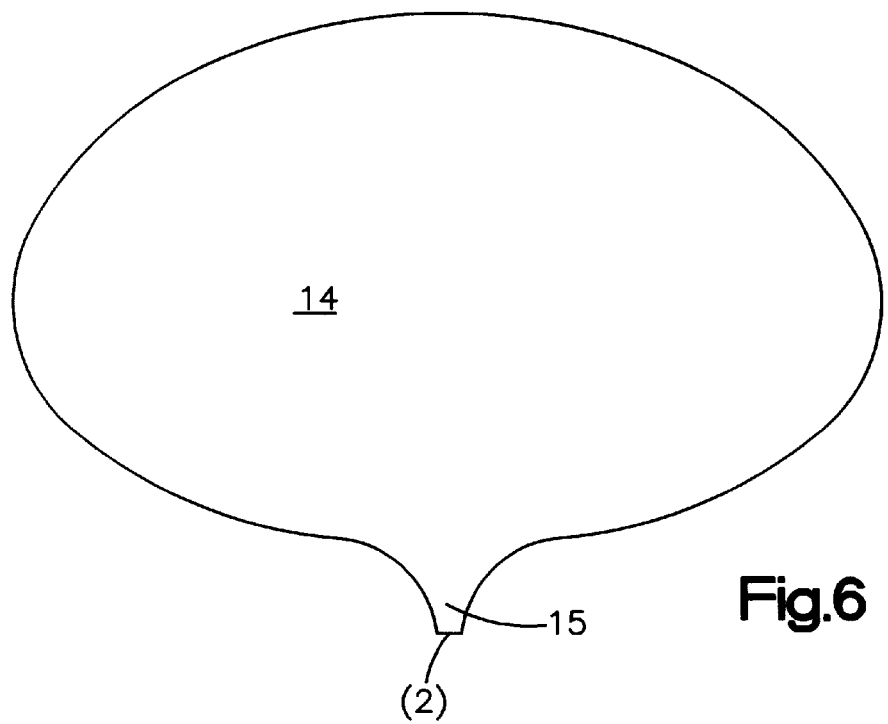
FIG. 6 shows an expediently designed fabric section.

In the embodiment according to FIG. 5, the gas bag 1 consists of two fabric sections 1*a*, 1*b* which are connected with each other via a meridian double seam 12. With such a seam, the thread 13 can be guided wholly or partially in the meridan double seam 12. FIG. 6 shows a fabric section 14 which is sewn for the production of a gas bag with a second, identically cut fabric section. In order to facilitate the contraction of the vent cross-section, a bottleneck-like shoulder 15 is provided on the fabric sections 14 which, when the gas bag is inflated, forms a region in which the fabric is exposed to considerably smaller tensions than in the remaining regions over which the thread 13 is guided according to the invention. This means that the resistance of the fabric which is stressed by the internal pressure with respect to a reduction of the vent cross-section 2 is smaller here and that one therefore manages with smaller "adjustment forces" for the adaptation of the outflow behaviour to the plunging body mass.

What is claimed is:

1. An impact protection device for vehicle occupants, comprising an inflatable gas bag and a gas generator for inflation of the gas bag on igniting of a propellant charge in the gas generator, the gas bag having a vent opening, said vent opening having a flow cross-section that is able to be reduced in proportion to an elastic expansion of the gas bag as a result of internal pressure which is generated when a vehicle occupant plunges into the inflated gas bag, wherein a non-elastic thread is arranged on the outer surface of the gas bag forming a loop around the vent opening, each end of the thread being attached to a stretchable surface portion of the gas bag.

2. The device according to claim 1, wherein sections of the thread are guided in guide members on the stretchable surface portions of the gas bag.

3. The device according to claim 2, wherein the guide members are formed by sewn-on fabric strips.

4. The device according to claim 1, wherein the thread has a main section guided along the edge of the vent opening.

5. The device according to claim 4, wherein the main section of the thread is guided by a folded edge portion of textile material bordering the vent opening.

6. The device according to claim 4, wherein the thread guided by a backstitch seam or zigzag seam formed in the textile material of the gas bag around the vent opening.

7. The device according to claim 1, wherein the gas bag comprises a pair of fabric sections which are connected with each other along a meridian double seam, the thread being guided at least partially in the meridian double seam.

* * * * *